U. GONNELLA.
CONTAINER SEALING MEANS.
APPLICATION FILED SEPT. 20, 1920.
1,404,113.
Patented Jan. 17, 1922.
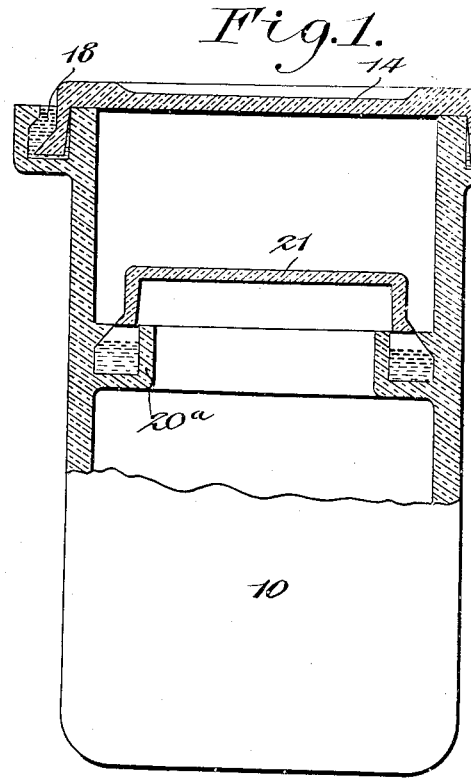
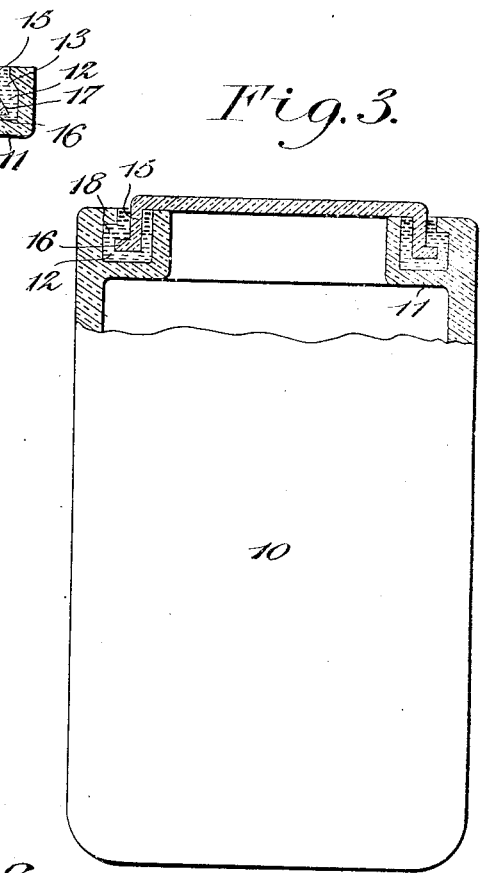
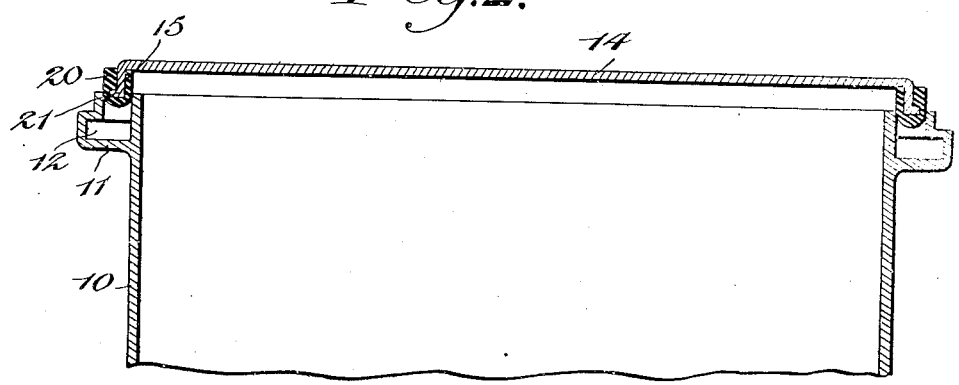
Umberto Gonnella, INVENTOR
BY Victor J. Evans, ATTORNEY
WITNESS: J. W. Ely

UNITED STATES PATENT OFFICE.

UMBERTO GONNELLA, OF NORTH PLAINFIELD, NEW JERSEY.

CONTAINER-SEALING MEANS.

1,404,113.  Specification of Letters Patent.  Patented Jan. 17, 1922.

Application filed September 20, 1920. Serial No. 411,455.

*To all whom it may concern:*

Be it known that I, UMBERTO GONNELLA, a citizen of Italy, residing at North Plainfield, in the county of Somerset and State of New Jersey, have invented new and useful Improvements in Container-Sealing Means, of which the following is a specification.

This invention relates to improvements in container sealing means, and the principal object is to provide a simple, convenient, economical and efficient seal for containers of all kinds.

Another object is to provide means whereby a disinfecting seal may be provided for garbage cans, hospital refuse containers, and the like.

Another object is to provide means whereby wax or other plastic material may be used in effecting a seal of a container as for jellies, milk, pickles, etc.

Other objects will appear hereinafter.

All of these objects are attained by the means set forth in the accompanying description and claims and fully illustrated in the accompanying drawing, consisting of one sheet, in which:—

Figure 1 is a vertical sectional view of a fruit jar embodying my invention.

Figure 2 is a similar view of a garbage pail embodying my invention.

Figure 3 is a view similar to Figure 1 but with the well on the inside of the jar.

Like characters of reference refer to like parts in all views.

Referring more particularly to the drawing, 10 represents a container which may be of any desired shape or material, and of any desired size, that shown in Figure 2 being a metal garbage pail while that shown in Figure 1 is a fruit jar. The container is formed adjacent to its opening so as to provide a horizontal flange 11 and a U-shaped annulus or well 12. The flange 11 may be provided with an inclined or round face 13.

The cover of the container is shown at 14 and is provided with a depending rim 15 having a flange 16 provided with an inclined face 17 or a tight fitting U-shaped rubber flange 20 secured by a bead 21 and extending on both sides of the rim 15.

In use, the cover is placed with its rim 15 extending into the well 12, and a liquid or melted metal 18 is poured into the well 12 so as to form a tight seal. In the case of a garbage can or the like the sealing liquid would in all probability be a disinfectant of some sort for temporary use; or wax, paraffin or a rubber ring or flange where the receptacle is to be transported to some distance; whereas in a fruit jar or can, the sealing medium 16 might be wax, paraffin or metal. A lock is formed by the co-action of the sealing material with flanges 11 and 16 so that the cover is securely held in place. It will be readily understood that water or any other sealing medium including metals and rubber compositions may be used according to the nature of the container to be sealed.

In using a rubber ring for the garbage can where garbage is being transported to a hog farm or such place, the member 20 is forced down the rounded edge of the flange 11 into the well 12.

In fruit jars and cans where it would be desirable to use a portion of the contents only at a time, one or more secondary annular wells 20 may be secured to the inside of the container and provided with a suitably sized cover 21 which may be sealed in place by some rubber composition or other composition which does not melt at boiling temperature. For preserving cans I prefer to use melted metal as a sealing agent. Where the cans are to be packed in boxes, the upper well 12 may be made on the interior of the container.

What I claim as new and desire to secure by Letters Patent is:—

1. In a device of the class described, the combination of a container comprising an annular well adjacent to its mouth and formed with an annular flange overlying said well, a cover comprising a rim adapted to extend into said well and formed with an external annular flange, and a sealing element secured to one of said flanges and co-active with both of said flanges so as to effect sealing of said container and automatically yieldingly lock said cover to said container.

2. In a device of the class described, the combination of a container comprising an annular well adjacent to its mouth and formed with an annular flange overlying said well, a cover comprising a rim adapted to extend into said well and formed with an external annular flange, and a sealing element secured to the flange of said cover and adapted to interlock with the first said flange to effect sealing of said container and the securing of said cover in place.

3. In a device of the class described, the combination of a container body provided with an annular well at the mouth of said body and with an annular well intermediate the ends of said body; covers having portions adapted to extend into said wells and to be sealed therein, said wells and covers being provided with co-active flanges, and a sealing medium between said flanges for locking said covers in said wells.

In testimony whereof I have affixed my signature.

UMBERTO GONNELLA.